United States Patent

Kumakura

[11] Patent Number: 5,995,769
[45] Date of Patent: *Nov. 30, 1999

[54] APPARATUS WHICH MAKES IT POSSIBLE OR NOT POSSIBLE TO START USING FILM AT POSITION OF AN UNUSED FRAME

[75] Inventor: Toshiyuki Kumakura, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,729

[22] Filed: Jan. 27, 1997

[30] Foreign Application Priority Data

Jan. 31, 1996 [JP] Japan ................................ 8-015723

[51] Int. Cl.⁶ ............................. G03B 7/00; G03B 17/24; G03B 19/02
[52] U.S. Cl. .......................... 396/210; 396/310; 396/319; 396/389
[58] Field of Search ..................... 396/210, 310, 396/319, 389, 390, 392, 397, 408

[56] References Cited

U.S. PATENT DOCUMENTS

| 5,017,326 | 5/1991 | Wash et al. | 396/390 |
| 5,113,208 | 5/1992 | Stoneham et al. | 396/319 |
| 5,182,589 | 1/1993 | Tamamura | 396/319 |
| 5,349,406 | 9/1994 | Johnson | 354/173.1 |
| 5,432,570 | 7/1995 | Ueda et al. | 396/319 |
| 5,477,289 | 12/1995 | Smart | 396/319 |
| 5,479,226 | 12/1995 | Kazami et al. | 354/21 |
| 5,598,236 | 1/1997 | Ueda et al. | 396/319 |
| 5,612,757 | 3/1997 | Amano | 396/319 |
| 5,614,969 | 3/1997 | Izukawa | 396/319 |

FOREIGN PATENT DOCUMENTS

| 0362892 | 4/1990 | European Pat. Off. . |
| 0687942 | 12/1995 | European Pat. Off. . |

OTHER PUBLICATIONS

Patent Abstracts of Japan No. JP 61 107312 A, published Sep. 30, 1986.

*Primary Examiner*—Eddie C. Lee
*Attorney, Agent, or Firm*—Robin, Blecker & Daley

[57] ABSTRACT

An apparatus such as a camera which makes it possible to start using a film at a position of an unused frame comprises a detecting device which detects a position of an unused frame of a film, and a control device which executes a control operation so that the film can start to be used at the position of the unused frame in accordance with a detection result by the detecting device, the control device making a determination as to a state of noise which acts on the detecting device and varying the control operation in accordance with a result of the determination.

60 Claims, 14 Drawing Sheets

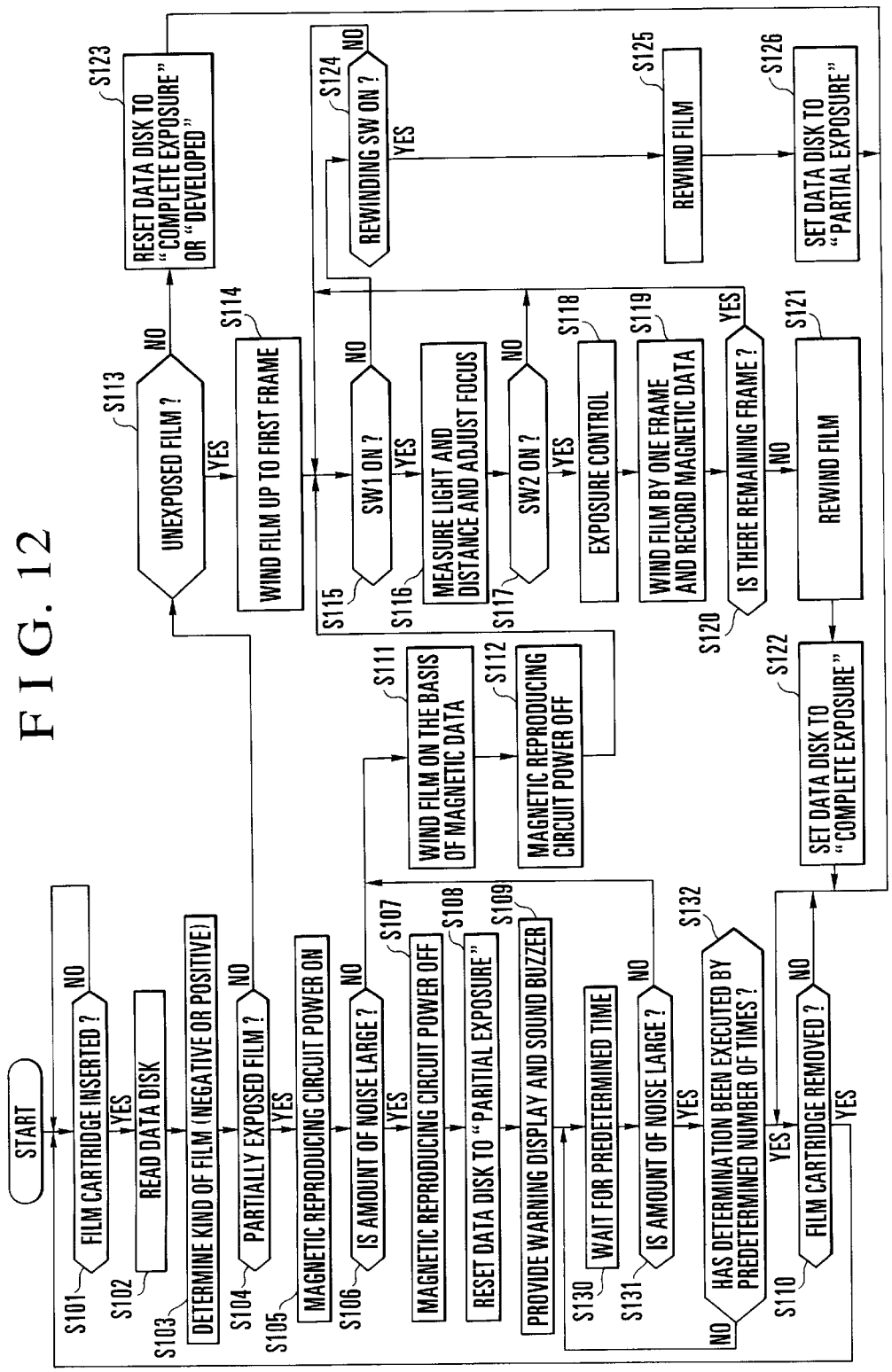

APPARATUS WHICH MAKES IT POSSIBLE OR NOT POSSIBLE TO START USING FILM AT POSITION OF AN UNUSED FRAME

BACKGROUND OF THE INVENTION

1. Field of the Invention

The present invention relates to an improvement in an apparatus such as a camera which makes it possible to automatically start reusing a partially used film of a film cartridge at the position of an unused frame.

2. Description of Related Art

Cameras which can make a magnetic recording on a film have heretofore been known. A film cartridge for use with such a camera is provided with an index which indicates the state of exposure of the film accommodated in the film cartridge, i.e., whether the film is an unexposed film, a completely exposed film or a partially exposed film. Accordingly, it has been proposed to provide a camera which, if a film cartridge having a partially exposed film is loaded into the camera, automatically winds the film up to the position of the first unexposed frame on the basis of information obtained from the index and information magnetically recorded on the partially exposed film.

In the aforesaid conventional example, the operation of advancing the film up to the position of the first unexposed frame is carried out by magnetically reproducing magnetic recorded information written to the film and determining whether each frame of the film is an unexposed frame or an exposed frame. In the case of this kind of film, a signal to be used for such a determination is commonly reproduced by a magnetic reproducing circuit having a large amplification degree because the density of the magnetic layer provided on the film is low.

In the case of such a magnetic reproducing method, the influence of external magnetic noise which enters the camera from the surroundings is not ignorable, and if a magnetic head picks up such noise during magnetic reproduction, the camera may become unable to discriminate between the noise and a magnetic signal written to the film itself and erroneously determine whether a particular frame of the film is an unexposed frame or an exposed frame. This leads to the problem that an exposed frame is again exposed.

BRIEF SUMMARY OF THE INVENTION

One aspect of the present invention is to provide an apparatus such as a camera which makes it possible to start using a film at a position of an unused frame, which apparatus comprises a detecting device which detects a position of an unused frame of a film, and a control device which executes a control operation so that the film can start to be used at the position of the unused frame in accordance with a detection result by the detecting device, the control device making a determination as to a state of noise which acts on the detecting device and varying the control operation in accordance with a result of the determination. The apparatus is prevented from failing to accurately determine the position of an unexposed frame of a film and causing an accident such as double exposure, owing to the noise which acts on the detecting device.

Other aspects of the present invention will become apparent from the following detailed description of preferred embodiments of the present invention, taken in conjunction with the accompanying drawings.

BRIEF DESCRIPTION OF THE SEVERAL VIEWS OF THE DRAWINGS

FIG. 12 is a flowchart showing a modification of the flowchart of FIG. 7 according to a fourth embodiment of the present invention;

DETAILED DESCRIPTION OF THE INVENTION

Preferred embodiments of the present invention will be described below in detail with reference to the accompanying drawings.

Figure 1:
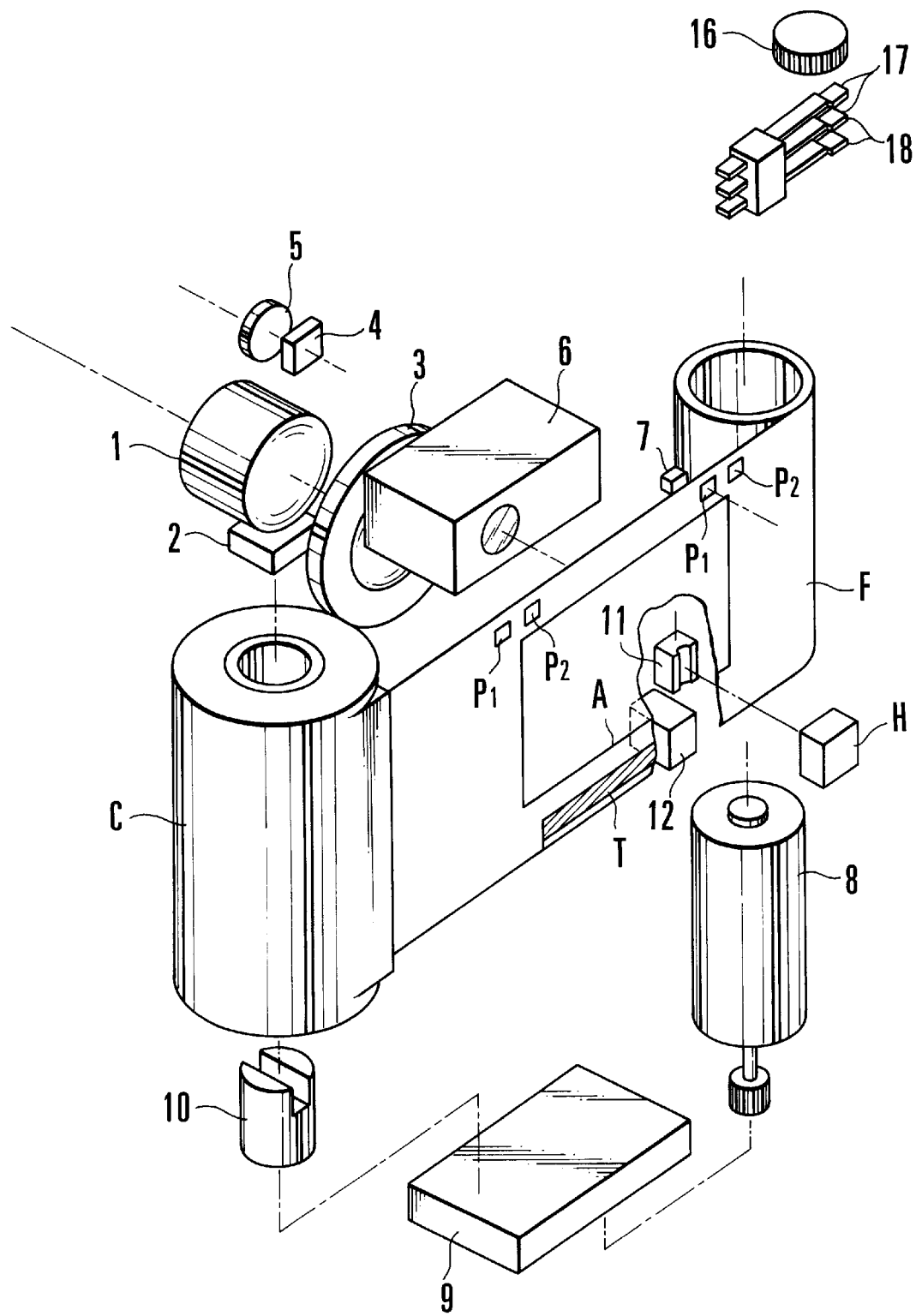
FIG. 1 is a diagrammatic perspective view showing the internal arrangement of the essential portion of a camera according to a first embodiment of the present invention.

FIG. 1 is a diagrammatic perspective view showing the internal arrangement of the essential portion of a camera according to a first embodiment of the present invention.

The arrangement shown in FIG. 1 comprises a photographing lens 1, a unit 2 including a lens actuator 2*a* which drives the photographing lens 1 and a lens encoder 2*b* which generates a position signal, a lens shutter 3, a light measuring sensor 4 for AE (automatic exposure), a lens 5 which determines the light receiving angle of the light measuring sensor 4, a block 6 including a distance measuring sensor 6*a* which will be described later and a viewfinder (not shown), a photoreflector 7 which detects perforations P1 and P2 (to be described later) formed in a film F and generates a signal for positioning the film F on frame-by-frame basis or a timing signal indicative of an end of writing information, a film transport motor 8 disposed in a spool, a gear train 9 which effects changeover between speed reduction and winding/rewinding, and a rewinding fork 10.

The film F is accommodated in a film cartridge C and includes a magnetic recording portion (a magnetic track T) provided on its base side and the perforations P1 and P2 which correspond to a photographic image plane A.

The arrangement shown in FIG. 1 also comprises a magnetic head H which writes or reads information to or from the magnetic track T provided on the film F, a pad 11 which presses the film F against the magnetic head H, the pad 11 having in its central portion a recess for enhancing the intimateness of contact between the film F and the head gap of the magnetic head H, a pad projecting/retracting control mechanism 12 which presses the pad 11 against the magnetic head H with a predetermined pressure with the film F inserted between the pad 11 and the magnetic head H, only during a film transport operation, a shutter release button 16, a switch (SW1) 17 which activates a light measuring operation and a distance measuring operation in response to a first stroke of the shutter release button 16, and a switch (SW2) 18 which starts a sequence for opening the lens shutter 3 and transporting the film F, in response to a second stroke of the shutter release button 16.

Figure 2:
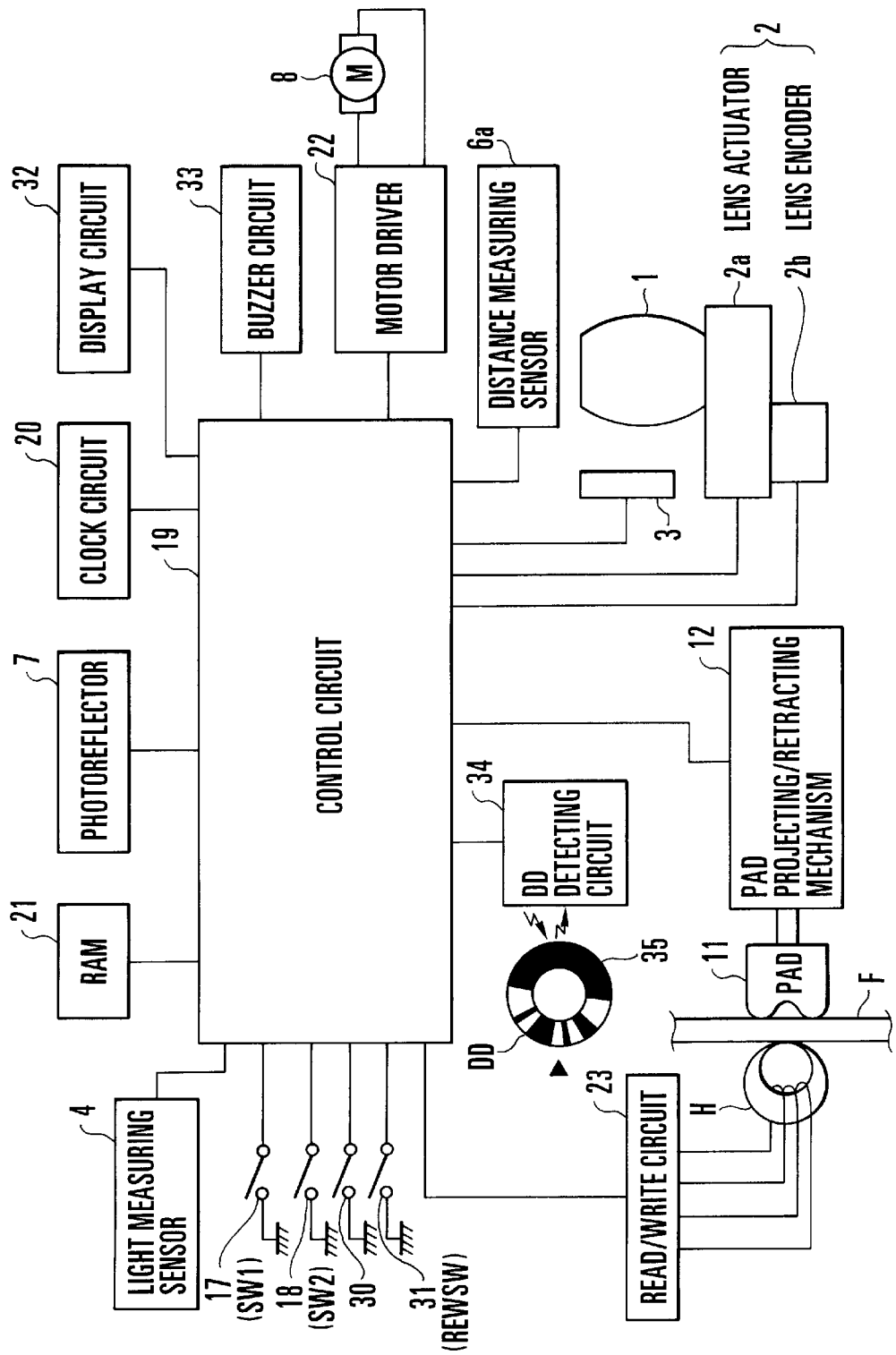
FIG. 2 is a circuit block diagram of the essential portion of the camera shown in FIG. 1.

FIG. 2 is a circuit block diagram of the aforesaid essential portion of the camera.

Figure 4:
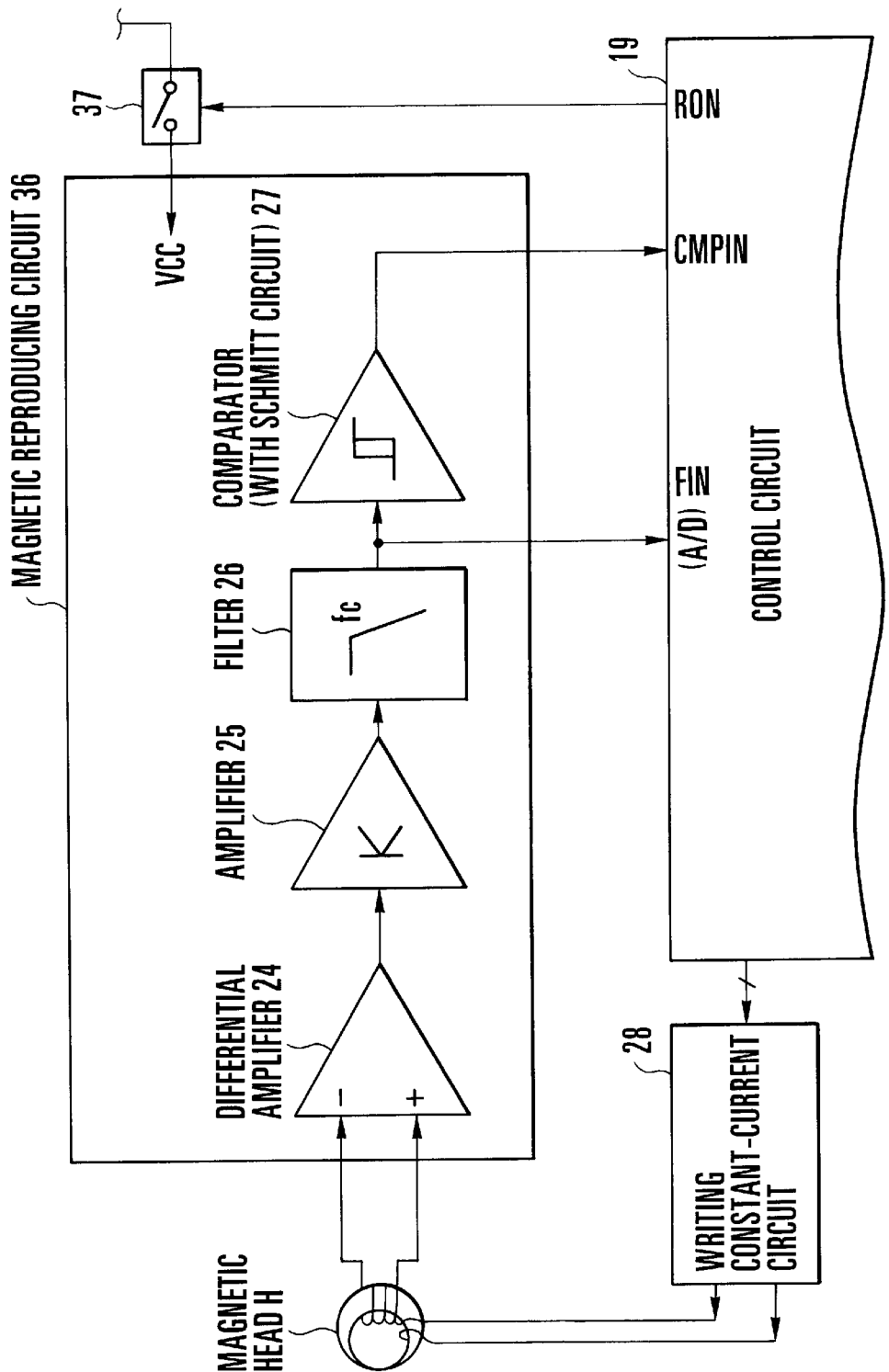
FIG. 4 is a view showing in detail the read/write circuit 23 shown in FIG. 2.

The circuit shown in FIG. 2 includes a control circuit 19 which controls various operations of the camera, the control circuit 19 being normally composed of a one-chip microcomputer, a known clock circuit 20, a RAM (random-access memory) 21 in which to record photography information used during photography, such as an aperture value and a shutter time, a read/write circuit 23 having the circuit construction shown in FIG. 4, a motor driver 22 which drives the film transport motor 8, a switch 30 for determining whether the film cartridge C is loaded into the camera, a rewinding start switch 31, a display circuit 32 composed of an LCD (liquid-crystal display) and the like, a buzzer circuit 33, and a DD (data disk) detecting circuit 34 which read data from a data disk 35 secured to the bottom of the film cartridge C. (The data disk 35 displays information, such as the kind of film and the ISO speed thereof, in a data format like a bar code.) The DD detecting circuit 34 is arranged to read an alternately bright and dark pattern made of alternating black and white radial regions, from the data disk 35 through a photoreflector (not shown) during the rotation of the data disk 35. The control circuit 19 is arranged to determine whether the film F accommodated in the film cartridge C is an unexposed film, a completely exposed film, a partially exposed film or a developed film, by determining the stop position of the alternately bright and dark pattern of the data disk 35.

Figure 11A:
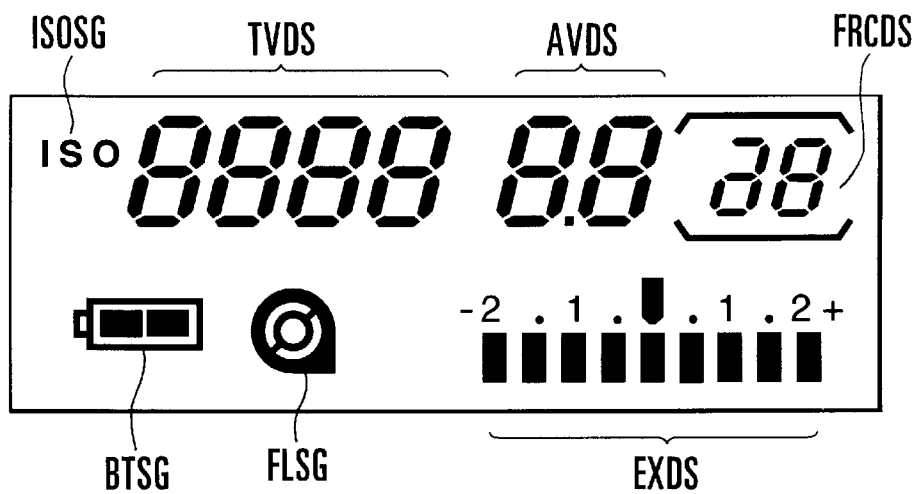
FIGS. 11(A), 11(B) and 11(C) are views showing display examples of the display circuit 32 shown in FIG. 2.
Figure 11B:
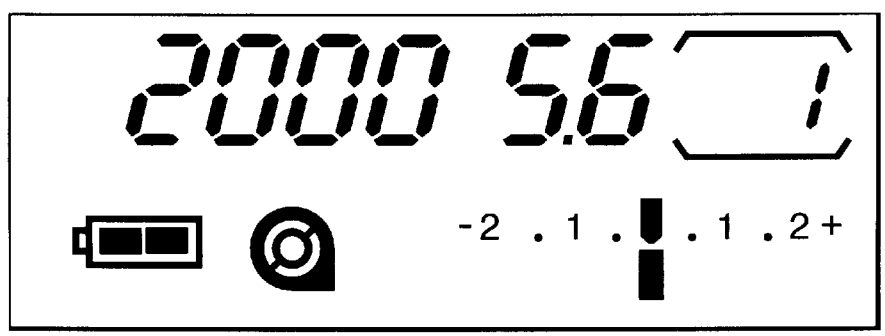
Figure 11C:
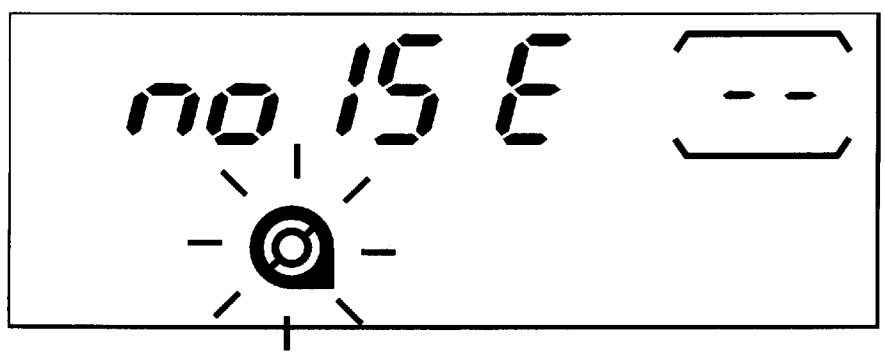

FIGS. 11(A) to 11(C) show specific examples of the display contents of the display circuit 32. FIG. 11(A) shows a state in which all the segments of the LCD are made dark. The LCD includes a segment group ISOSG for providing ISO display, a segment group TVDS for displaying a shutter time, a segment group AVDS for displaying an aperture value, a segment group FRCDS for displaying a frame counter, a display segment group BTSG for displaying the state of a battery, a display segment group FLSG for displaying the state of the film cartridge C, and a segment group EXDS for displaying an exposure compensation level.

Figure 3:
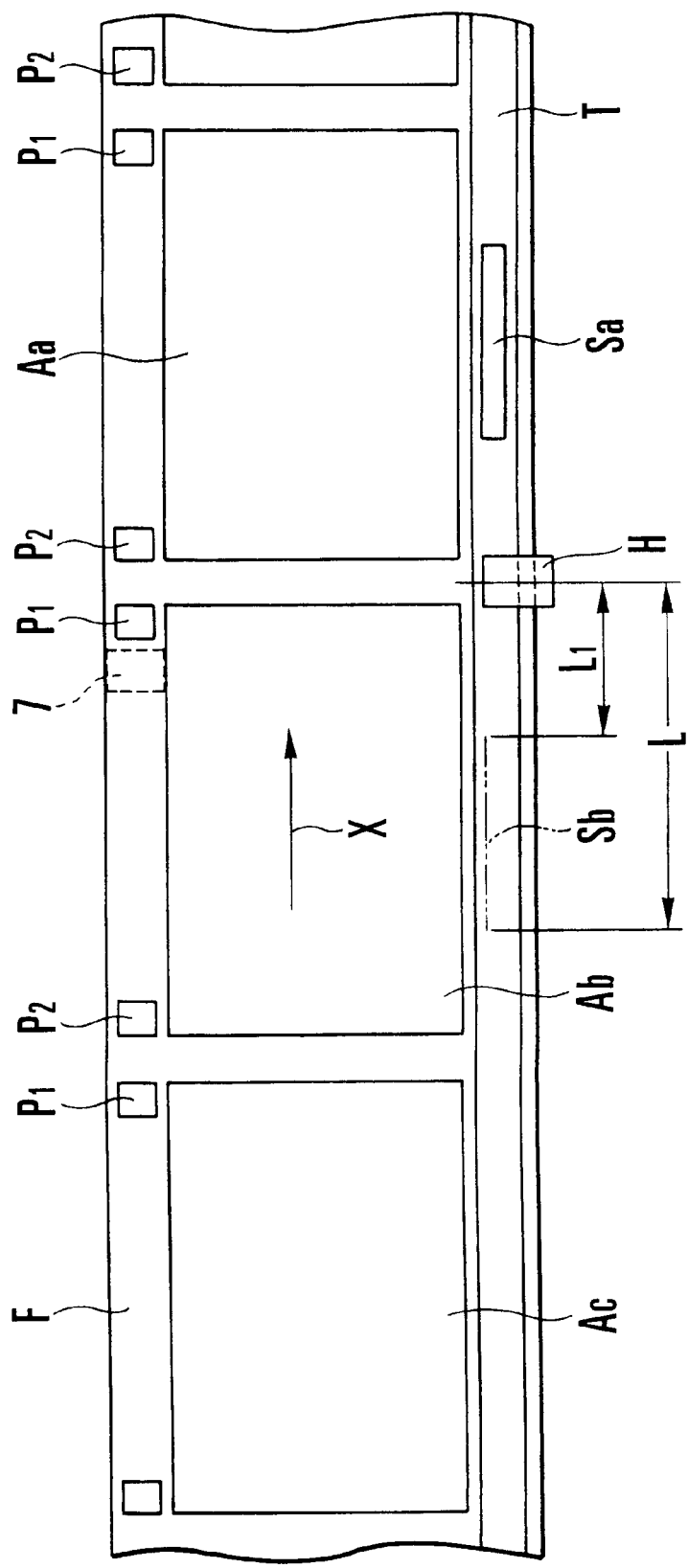
FIG. 3 is a view showing the positional relations among a film, a photoreflector and the magnetic head in the camera shown in FIG. 1.

FIG. 3 is a view showing the relations among the film F, the photoreflector 7 and the magnetic head H, and shows the side of the film F opposite to the photographing lens 1.

In FIG. 3, symbol Aa denotes a photographic image plane Aa which is already exposed, symbol Ab denotes a photographic image plane which is located at an aperture position so that it can be exposed, and symbol Ac denotes a photographic image plane which is to be exposed following the photographic image plane Ab. Symbol T denotes the aforementioned magnetic track provided on the film F. Symbol Sa denotes an area into which photography information such as a shutter time and the date of photography was written during the advance of the photographic image plane Aa in the direction of winding of the film F. Symbol Sb denotes an area into which to write photography information in the next advance cycle. Symbol X denotes an arrow which indicates the winding direction of the film F.

FIG. 4 is a view showing in detail the read/write circuit 23 shown in FIG. 2. In FIG. 4, a block 36 represents a read circuit portion, i.e., a magnetic reproducing circuit, which constitutes part of the read/write circuit 23. The read/write circuit 23 also includes a differential amplifier 24, an amplifier 25, a filter 26, a comparator 27 provided with a Schmitt circuit, a writing constant-current circuit 28, and a semiconductor switch 37 for control of a power source.

When a magnetic reproduced signal outputted from the magnetic head H is applied to two inputs of the differential amplifier 24, the differential amplifier 24 outputs the difference between the two signal inputs, and the difference output is amplified by the amplifier 25. The amplified signal outputted from the amplifier 25 is limited in frequency band and improved in signal-to-noise ratio through the filter 26 (in FIG. 4, a frequency fc corresponds to a cut-off frequency).

The output signal of the filter 26 is inputted to the comparator 27 provided with the Schmitt circuit, and if the input signal level exceeds a predetermined level, the comparator 27 outputs a high-level signal, whereas if it is lower than the predetermined level, the comparator 27 outputs a low-level signal. The high- or low-level signal is inputted to the control circuit 19.

Figure 5:
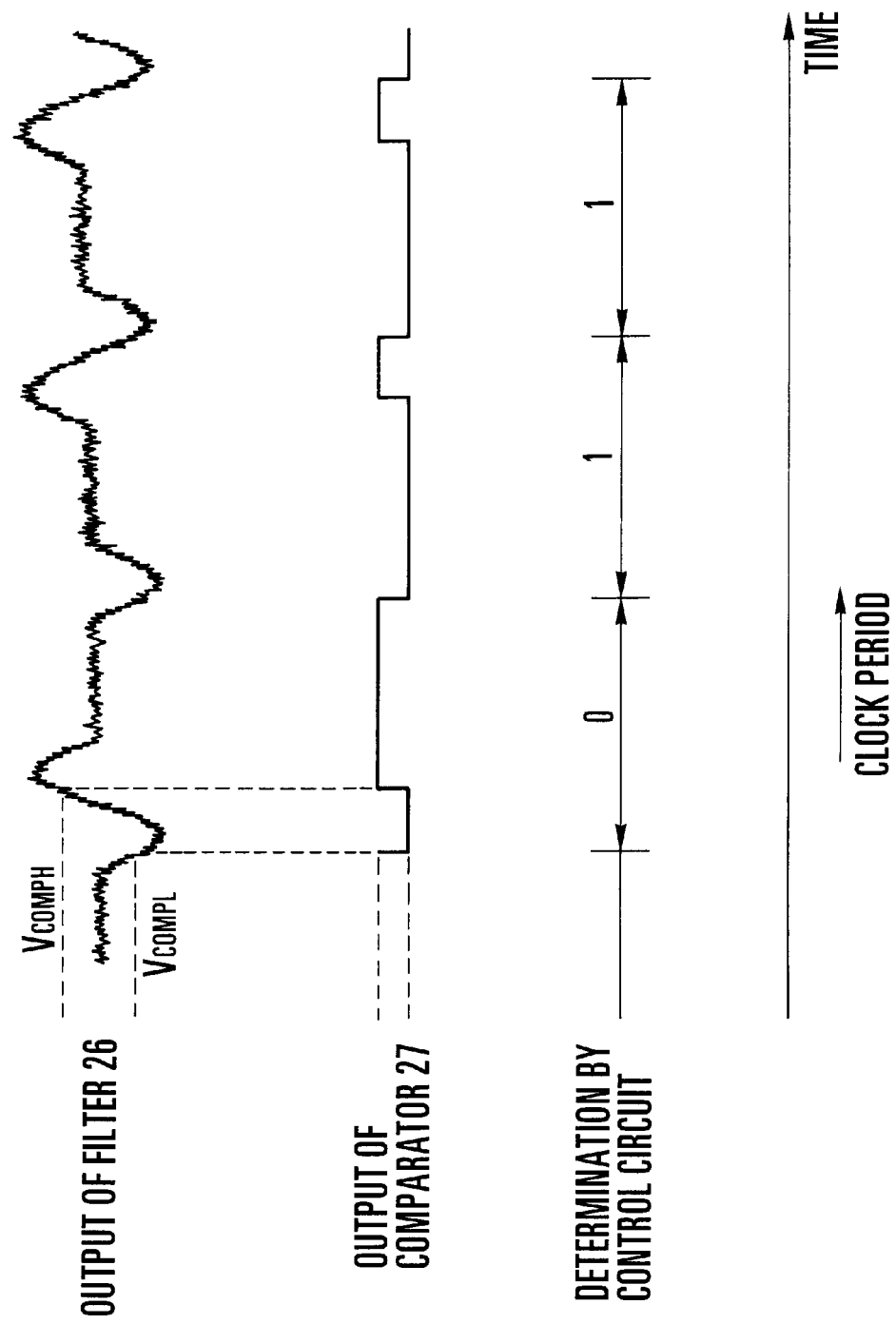
FIG. 5 is a diagram showing signal waveforms produced in the circuit shown in FIG. 4.

This process will be described in more detail with reference to FIG. 5. The reproduced waveform which is outputted from the magnetic reproducing circuit 36 during the travel of the film F appears at the output of the filter 26 as a signal which varies between its low level and its high level with respect to a certain reference level in a pulsed manner as shown in FIG. 5. The output waveform of the filter 26 is inputted to the comparator 27, and the comparator 27 outputs a pulse waveform as shown in FIG. 5. This pulse waveform is inputted to the control circuit 19, and the control circuit 19 periodically measures the time required for the input pulse waveform to rise from its low-level active edge to its high-level active edge and converts the length of the measured time into a digital signal. In the example shown in FIG. 5, the control circuit 19 determines that the output from the magnetic reproducing circuit 36 is "011". This operation is equivalent to the operation of identifying the phase of the pulse waveform.

By converting the reproduced waveform supplied from the magnetic reproducing circuit 36 into the digital signal in the above-described manner, the control circuit 19 can identify the data magnetically recorded on the film F, for example, an exposure value, a shutter time, an aperture value and the date or time of photography.

Figure 6:
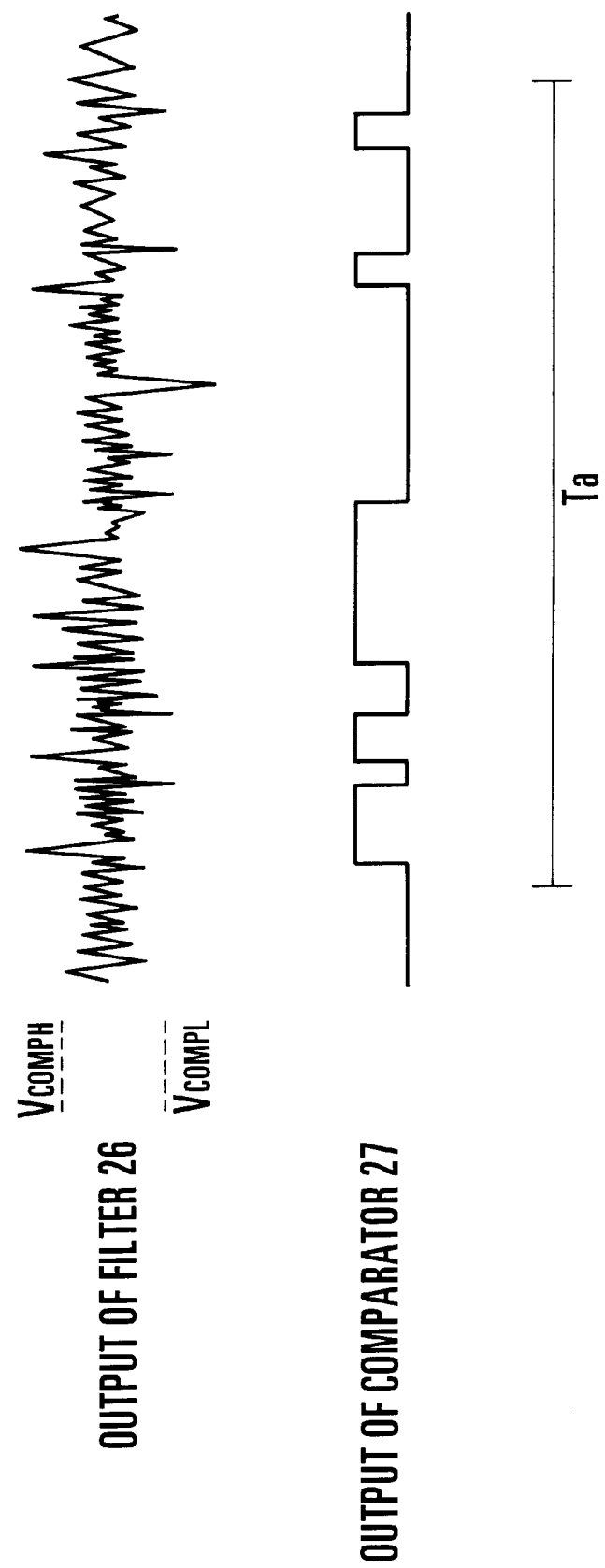
FIG. 6 is a diagram showing signal waveforms produced in the circuit of FIG. 4 when the noise thereof is large.

The waveform example shown in FIG. 5 is a waveform which appears during the driving of the film F if an external noise level is small. However, if the external noise level is large (even if the film F is not travelling), a waveform of the shape shown in FIG. 6 will appear. It is natural that no signal (i.e., no variation in signal level) is provided at the output of the comparator 27 when the film F is not travelling, but if the waveform of the external noise level is large in amplitude as shown in FIG. 6, the output level of the comparator 27 varies irrespective of the presence or absence of the aforesaid reproduced waveform. Specifically, each time the external noise level exceeds the high or low level of the comparator 27, a variation in signal level appears at the output of the comparator 27.

The operation of the entire arrangement will be described below with reference to FIG. 7 which shows a flowchart of the operation of the control circuit 19.

First, in Step S101, the control circuit 19 determines from the state of the switch 30 whether the film cartridge C has been loaded into the camera. If it is determined that the film cartridge C has been loaded into the camera, the control circuit 19 reads data-disk information from the data disk 35 in Step S102. For example, the control circuit 19 causes the spool of the film cartridge C to rotate in the direction opposite to the direction of film winding, and reads data indicative of the state of exposure of the film F (unexposed, completely exposed, partially exposed, developed) on the basis of a rotational position at which the data disk 35 is located at the time of the start of rotation of the spool of the film cartridge C. Further, the control circuit 19 reads data indicative of the kind of the film F (negative or positive) and data indicative of the ISO speed of the film F.

Then, in Step S103, the control circuit 19 selects the data indicative of the kind of the film F from the read data-disk information to be used in this routine, and determines whether the kind of the film F is negative or positive.

In Step S104, the control circuit 19 determines whether the film F of the loaded film cartridge C is a partially exposed film, from the data indicative of the state of exposure of the film F, which data has been read in Step S102. If the film F is a partially exposed film, the control circuit 19 turns on the power source of the magnetic reproducing circuit 36 in Step S105. Specifically, the control circuit 19 outputs, for example, a high-level signal to the semiconductor switch 37 shown in FIG. 4 through a terminal RON, thereby turning on the semiconductor switch 37 to supply a source voltage to the magnetic reproducing circuit 36.

Then, in Step S106, the control circuit 19 determines whether the amount of static noise of the magnetic reproducing circuit 36 is large. Step S106 is incorporated as a subroutine which is specifically represented by the flowchart shown in FIG. 8.

Figure 8:
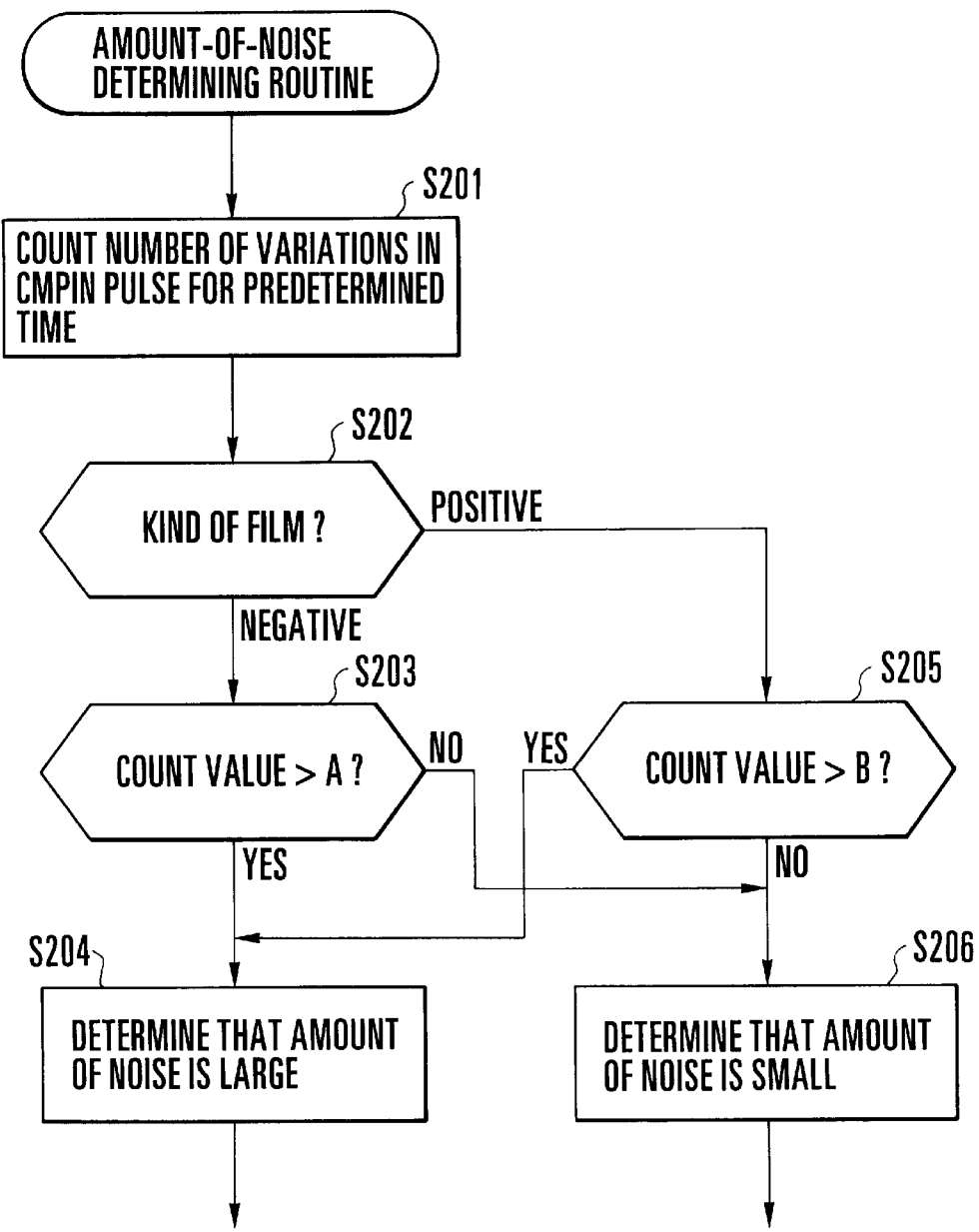
FIG. 8 is a flowchart of the amount-of-noise determining step shown in FIG. 7.

Referring to FIG. 8, in Step S201, the control circuit 19 receives through a terminal CMPIN the output from the comparator 27 provided in the magnetic reproducing circuit 36 of FIG. 4, and counts the number of variations in pulses applied to the terminal CMPIN during a predetermined time. FIG. 6 shows a waveform example obtainable during this time, and in FIG. 6, symbol Ta denotes the predetermined time. As shown in FIG. 6, if the amount of noise is large, noise which exceeds a reference high level $V_{COMPH}$ or a reference low level $V_{COMPL}$ occasionally appears at the output of the filter 26 in the magnetic reproducing circuit 36. The output level of the comparator 27 is repeatedly inverted from low to high and from high to low according to the noise which exceeds the reference high level $V_{COMPH}$ or the reference low level $V_{COMPL}$, and the number of such inversions is counted by the control circuit 19. In the example shown in FIG. 6, ten inversions are counted during the time Ta. The period of such inversion irregularly varies depending on the noise.

Figure 7:
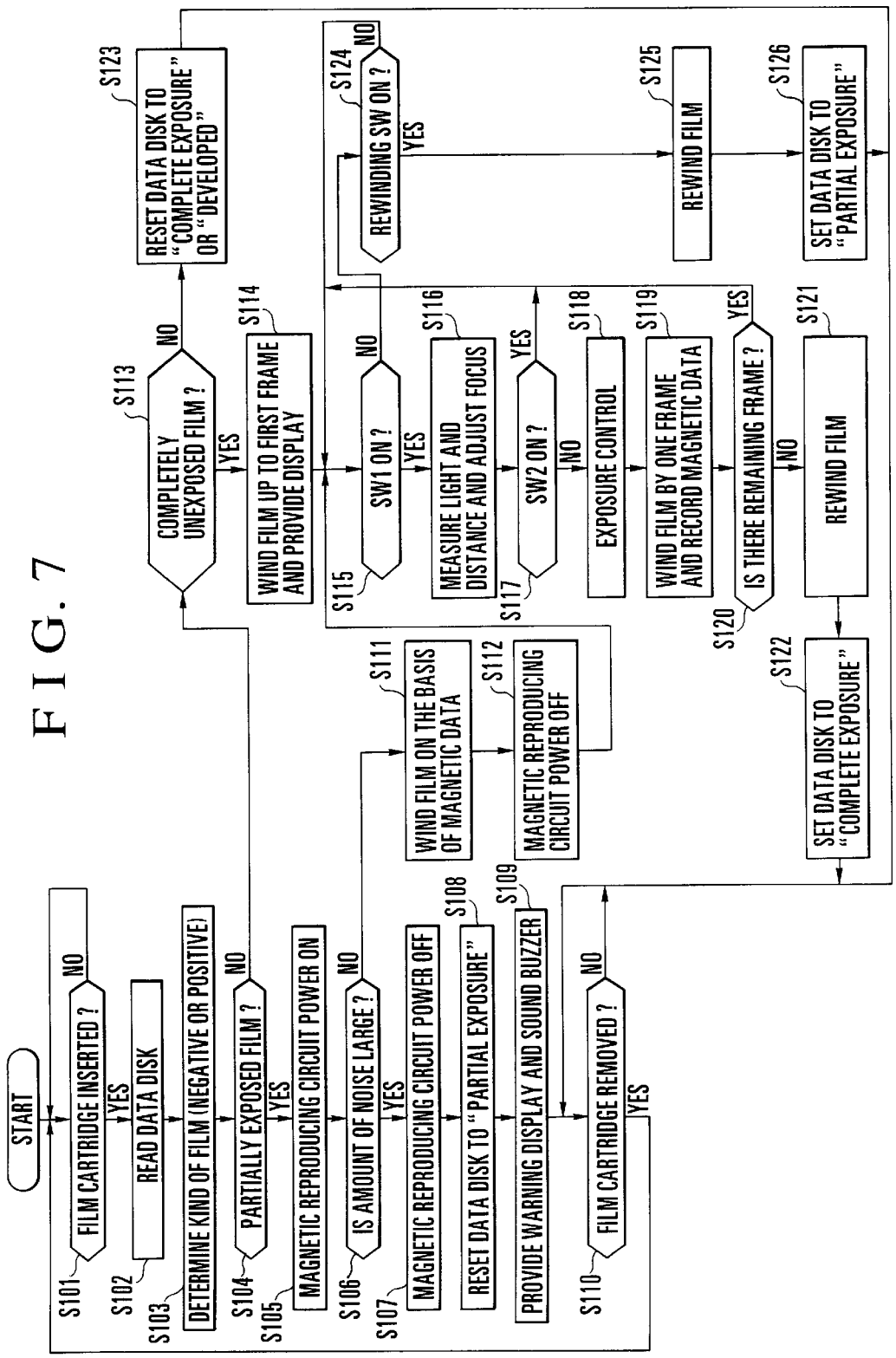
FIG. 7 is a flowchart of the control circuit 19 shown in FIG. 2.

Then, in Step S202, the control circuit 19 determines whether the kind of the film F is negative or positive, on the basis of the information obtained in Step S103 of FIG. 7. If the kind of the film F is a negative film, the process proceeds from Step S202 to Step S203, in which the control circuit 19 compares the count value obtained in Step S201 with a predetermined value A. If the count value is greater than the predetermined value A, the process proceeds from Step S203 to Step S204, in which the control circuit 19 determines that the amount of noise is larger than the allowable amount of noise, i.e., the amount of noise is too large to ensure that the position of an unexposed frame can be accurately identified by reading magnetic information from the film F (such an amount of noise is hereinafter referred to as "a large amount of noise" or the like). If the count value is smaller than the predetermined value A, the process proceeds from Step S203 to Step S206, in which the control circuit 19 determines that the amount of noise is smaller than the allowable amount of noise, i.e., the amount of noise is small enough to ensure that the position of an unexposed frame can be accurately identified by reading magnetic information from the film F (such an amount of noise is hereinafter referred to as "a small amount of noise" or the like).

Normally, if there is no noise, the count value is approximately equal to zero and it is determined in Step S206 that the noise is a small amount of noise.

If it is determined in Step S202 that the kind of the film F is a positive film, the process proceeds from Step S202 to Step S205, in which the control circuit 19 compares the count value with a predetermined value B.

If the count value is greater than the predetermined value B, the process proceeds from Step S205 to Step S204, in which the control circuit 19 determines that the noise is a large amount of noise. If the count value is smaller than the predetermined value B, the process proceeds from Step S205 to Step S206, in which the control circuit 19 determines that the noise is a small amount of noise.

The predetermined values A and B are normally selected to be A>B. This is because since the density of a magnetic layer can be made higher on negative film than on positive film, the negative film can provide a higher magnetic output during reproduction, so that even if the external noise level is high, magnetic data signals can be more accurately read from the negative film than from the positive film. In other words, the allowable amount of noise of the positive film is smaller than that of the negative film.

The control circuit 19 (control device) thus determines whether noise which acts on the detecting device (magnetic reproducing circuit 36) is in or more than a predetermined state (large amount of noise) when the detecting device is not in a state of reading the information recorded on the film and executes a second control operation for restricting the first control operation (film winding and reading magnetically recorded data on the film) in accordance with determining that the noise is or more than in the predetermined state.

Otherwise stated, the control device determines whether noise which acts on the detecting device is in a predetermined state when the detecting device is not in a state of reading the information recorded on the film and executes a control operation for restricting the detecting device from detecting the position of the unused frame of the film, i.e., in FIG. 7, precluding progress to step 111, which detects the position of the first unexposed frame.

Still further, the invention provides a control device which determines whether noise which acts on the magnetic information reading device is in a predetermined state when the detecting device is not in a state of reading the magnetic information recorded on the film, and stops a supply of electric power (Step S107) to the magnetic information reading device in accordance with determining that the noise is in the predetermined state.

If it is determined in Step S106 that the noise is a large amount of noise, through the routine of FIG. 8 for determining whether the amount of noise is large or small, the process proceeds to Step S107, in which the control circuit 19 turns off the power source of the magnetic reproducing circuit 36. In Step S107, contrary to Step S105, the control circuit 19 outputs a low-level signal to the semiconductor switch 37 through the terminal RON, thereby turning on the semiconductor switch 37 to stop the supply of the source voltage to the magnetic reproducing circuit 36.

Then, in Step S108, the control circuit 19 resets the data disk 35 to a position indicative of partially exposed film. In Step S108, the control circuit 19 causes the data disk 35 to rotate in the reading direction thereof, i.e., causes the film transport motor 8 to rotate in the direction opposite to the winding direction (i.e., in the rewinding direction) to rotate the data disk 35, thereby stopping the data disk 35 at the position indicative of partially exposed film.

Then, in Step S109, the control circuit 19 causes the display circuit 32 to provide a warning display. An example of the warning display is shown in FIG. 11(C). As shown in FIG. 11(C), the segment groups TVDS and AVDS of the LCD are made to provide display representative of "noise", while the display segment group FLSG for displaying the state of the film cartridge C is made to blink, thereby providing the warning display. The segment group FRCDS for displaying a frame counter is made to display the mark "--".

In addition, in Step S109, the control circuit 19 causes the buzzer circuit 33 to sound a buzzer for a predetermined time.

In Step S110, the control circuit 19 determines through the switch 30 whether the film cartridge C has been removed from the camera by a photographer. If it is determined that the film cartridge C has been removed, the process returns to Step S101.

If the control circuit 19 determines in Step S106 that the noise is not a large amount of noise, the process proceeds to Step S111, in which the control circuit 19 determines whether each frame of the film F is an exposed frame or an unexposed frame, while reproducing the magnetic data written in each frame by means of the magnetic reproducing circuit 36, and winds the film F up to the position of the first unexposed frame.

The method of determining whether each frame is an exposed frame or an unexposed frame makes use of the magnetic data written in each frame. Since each exposed frame has the magnetic data, such as a shutter time and an aperture value used in photography and the date of photography, the output of the comparator 27 varies regularly as shown in FIG. 5 while the magnetic data is being reproduced from each exposed frame. In contrast, since such magnetic data are not yet written in any unexposed frame, the output of the filter 26 remains at a 0 level, so that the output of the comparator 27 does not vary at all.

On the basis of the above-described states of variations in pulses, it is possible to determine whether each frame is an exposed frame or an unexposed frame. In Step S111, although the display shown in FIG. 11(B) is provided on the display circuit 32, the segment groups FRCDS for displaying a frame counter displays the number of advanced frames.

Then, in Step S112, the control circuit 19 turns off the power source of the magnetic reproducing circuit 36 in a manner similar to that described previously in connection with Step S107. Then, the process proceeds to Step S115 for starting a photographic sequence.

If the control circuit 19 determines in Step S104 that the film F of the loaded film cartridge C is not a partially exposed film, the process proceeds to Step S113, in which the control circuit 19 determines whether the film F is a completely unexposed film. If it is determined in Step S113 that the film F is not a completely unexposed film, i.e., the film F is a completely exposed film or a developed film, the process proceeds to Step S123, in which the control circuit 19 resets the data disk 35 to a position indicative of completely exposed film or a position indicative of developed film by stopping the data disk 35 at either of the positions in a manner similar to that described previously in connection with Step S108.

Then, in Step S110, the process waits for the film cartridge C to be removed from the camera.

If it is determined in Step S113 that the film F is a completely unexposed film, the process proceeds to Step S114, in which the control circuit 19 causes the film F to be wound up to the first frame and make preparations for photography, and also causes the display circuit 32 to display the contents shown in FIG. 11(B). At this time, the respective segment groups TVDS and AVDS display the shutter time and the aperture value which are set according to a particular exposure mode or the like of the camera, and the segment group FRCDS displays "1".

Then, the control circuit 19 determines in Step S115 that the SW1 17 is on. If the SW1 17 is on, the process proceeds to Step S116, in which the control circuit 19 performs light measurement by means of the light measuring sensor 4 and determines a shutter time and an aperture value which are parameters for exposure control. Further, the control circuit 19 performs distance measurement by means of the distance measuring sensor 6a and calculates the distance to a subject and performs focus adjustment by driving the photographing lens 1 to an in-focus position by means of the lens actuator 2a and the lens encoder 2b.

If the SW2 18 is on in Step S117, the process proceeds to Step S118, in which the control circuit 19 performs exposure control by controlling the lens shutter 3 on the basis of the shutter time and the aperture value obtained in Step S116. After the completion of the exposure control, in Step S119, the control circuit 19 winds the film F by one frame by means of the motor driver 22, and records magnetic data on the film F by means of the magnetic head H through the writing constant-current circuit 28 of FIG. 4, during the travel of the film F due to this winding operation. During this time, the magnetic head H, the film F and the pad 11 are maintained in stable contact with each other by the pad 11 and the pad projecting/retracting control mechanism 12. The magnetic data written in this manner contains the shutter time and the aperture value used in photography, the date and time of photography, and the like.

After the completion of the winding operation, the control circuit 19 determines in Step S120 whether the film F has a remaining frame. If there is no remaining frame, the process proceeds to Step S121, in which the control circuit 19 causes the motor driver 22 to perform the operation of rewinding the film F.

After the completion of the rewinding operation, the process proceeds to Step S122, in which the control circuit 19 sets the data disk 35 to the position indicative of completely exposed film. Then, in Step S110, the process waits for the film cartridge C to be removed from the camera.

If it is determined in Step S120 that there is a remaining frame, the process returns to Step S115, in which the control circuit 19 starts the next photographic sequence.

If the SW2 18 is not on in Step S117, the process returns to Step S115, and if the SW1 17 is not on in Step S115, the process proceeds to Step S124, in which the control circuit 19 determines whether the rewinding start switch 31 is on.

If the rewinding start switch 31 is on, the process proceeds to Step S125, in which the control circuit 19 causes the motor driver 22 to perform the operation of rewinding the film F. In Step S126, since the film F rewound into the film cartridge C is only partially used, the control circuit 19 sets the data disk 35 to the position indicative of partially exposed film. Then, the process proceeds to Step S110.

A second embodiment of the present invention will be described below. The second embodiment differs from the first embodiment in the processing of Step S106 which is the routine for determining whether the amount of noise is large.

Figure 9:
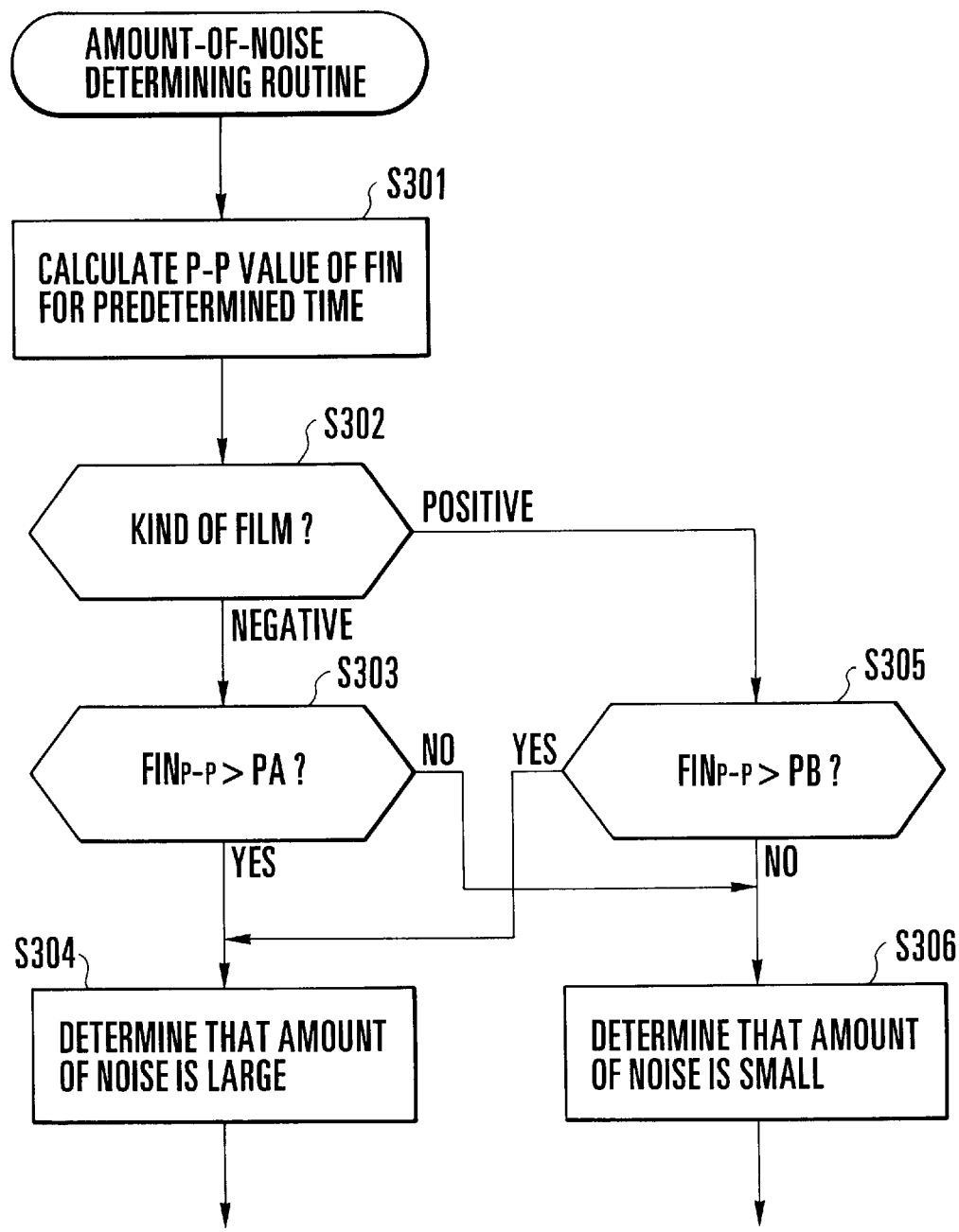
FIG. 9 is a flowchart showing another example of the amount-of-noise determining step of FIG. 7 according to a second embodiment of the present invention.

FIG. 9 is a flowchart showing the processing of Step S106 to be executed in the second embodiment. In Step S301 of FIG. 9, the control circuit 19 calculates the p—p (peak-to-peak) value of a signal FIN which is supplied to the control circuit 19 during a predetermined time. Specifically, the output of the filter 26 shown in FIG. 4 is supplied to the control circuit 19 as the analog input FIN, and the control circuit 19 converts the analog input FIN into digital data and stores the number of samples of the digital data during the predetermined time, and calculates the P—P value of the digital value, i.e., a value (MAX–MIN).

Then, in Step S302, the control circuit 19 determines whether the kind of the film F is negative or positive, and if the kind of the film F is a negative film, the process proceeds to Step S303, in which the control circuit 19 compares the P—P value with a predetermined amount PA. If the kind of the film F is a positive film, the process proceeds to Step S305, in which the control circuit 19 compares the P—P value with a predetermined amount PB. If the P—P value is greater than the predetermined amount PA or PB, the process proceeds to Step S304, in which the control circuit 19 determines that the noise is a large amount of noise. If the P—P value is smaller than the predetermined amount PA or PB, the process proceeds to Step S306, in which the control circuit 19 determines that the noise is a small amount of noise.

Similarly to the routine of FIG. 8, the P—P value, which is calculated from the analog FIN signal, increases with an increase in the amount of noise, and since the allowable amount of noise of the positive film is smaller than that of the negative film, the P—P value for the negative film can be made larger than that for the positive film, i.e., the predetermined amounts PA and PB are selected to be PA>PB.

In the second embodiment, by calculating the P—P value of the analog FIN signal, it is possible to perform higher-precision control than in the first embodiment of FIG. 8 in which a similar determination is carried out in digital form.

A third embodiment of the present invention will be described below. In the third embodiment, an RMS value is used in the routine of Step S106 for determining whether the amount of noise is large.

The routine of Step S106 used in the third embodiment will be described below with reference to the flowchart shown in FIG. 10.

Figure 10:
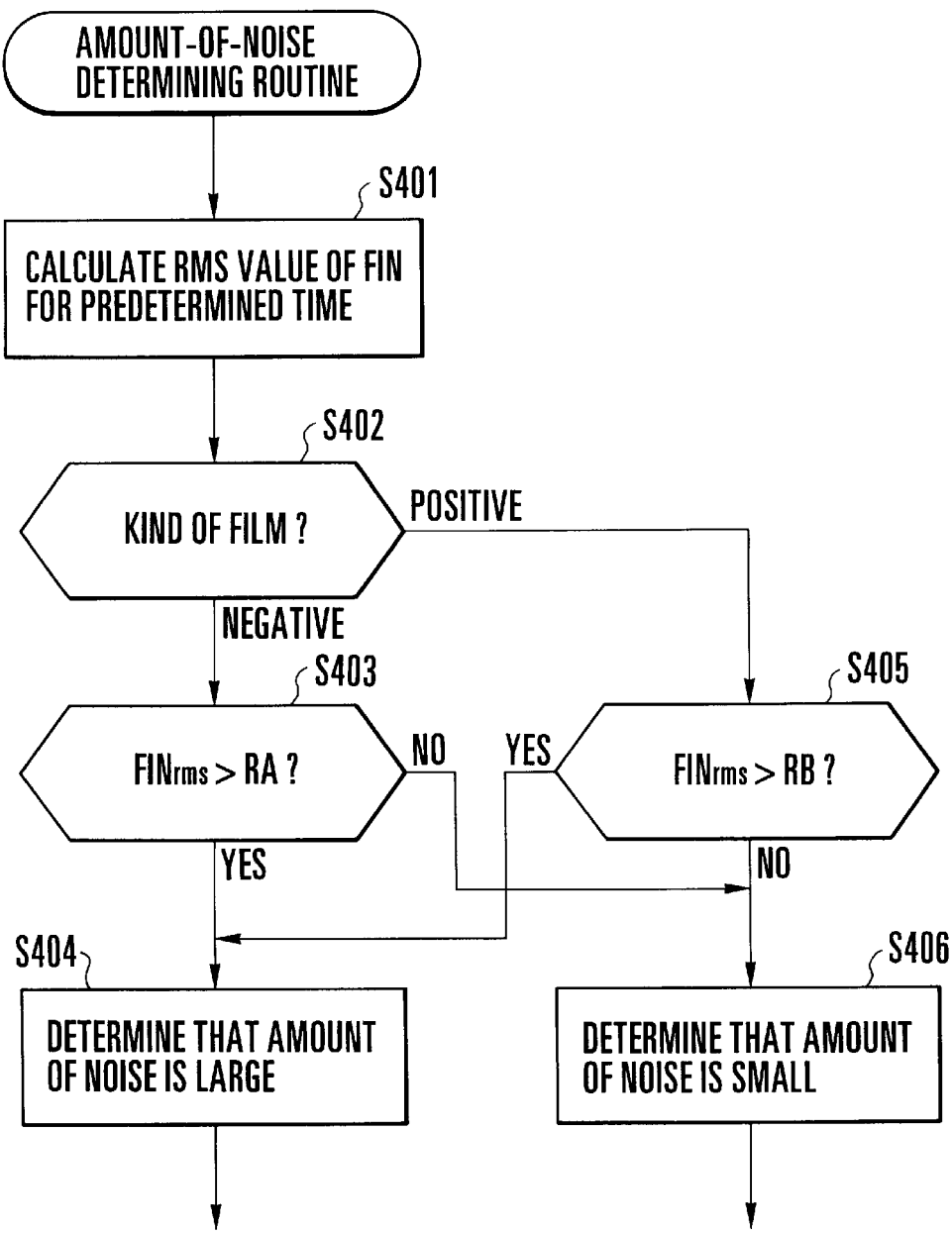
FIG. 10 is a flowchart showing still another example of the amount-of-noise determining step of FIG. 7 according to a third embodiment of the present invention.

In Step S401 of FIG. 10, the control circuit 19 calculates the RMS (root-mean-square) value of the signal FIN which is supplied to the control circuit 19 during a predetermined time. Specifically, in a manner similar to that described above with reference to FIG. 9, the control circuit 19 converts the analog input FIN into digital data for the predetermined time, and calculates the RMS value of the digital data to obtain an effective value of noise.

Then, in Step S402, the control circuit 19 determines whether the kind of the film F is negative or positive, and if the kind of the film F is a negative film, the process proceeds to Step S403, in which the control circuit 19 compares the RMS value with a predetermined value RA. If the kind of the film F is a positive film, the process proceeds to Step S405, in which the control circuit 19 compares the RMS value with a predetermined value RB. If the RMS value is greater than the predetermined value RA or RB, the process proceeds to Step S404, in which the control circuit 19 determines that the noise is a large amount of noise. If the RMS value is smaller than the predetermined value RA or RB, the process proceeds to Step S406, in which the control circuit 19 determines that the noise is a small amount of noise. In the third embodiment as well, for the same reason as each of the first and second embodiments, the predetermined amounts RA and RB are selected to be RA>RB.

In the third embodiment, by calculating the RMS value of the analog FIN signal, it is possible to realize higher reliability than in the second embodiment using the P—P value. Specifically, unlike the P—P value which occasionally becomes large, the RMS value is comparatively stable, so that more stable control is effected.

A fourth embodiment of the present invention will be described below with reference to the flowchart shown in FIG. 12.

In any of the first to third embodiments, the control circuit 19 determines only once whether the amount of noise is large, and if the amount of noise is large, the control circuit 19 sets the film cartridge C to the initial state thereof without performing anything. In contrast, in the fourth embodiment, after it is determined once that the amount of noise is large, it is further determined by a plurality of times whether the amount of noise is large, and if it is determined that the amount of noise is small, the control circuit 19 winds the film F up to the first unexposed film.

In FIG. 12, identical reference numerals are used to denote steps identical to those shown in FIG. 7. In FIG. 12, after a warning display is provided in Step S109, the process waits for the elapse of a predetermined time in Step S130, and it is determined in Step S131 whether the amount of noise is large, in a manner similar to that described previously in connection with the routine of Step S106. If the amount of noise is large, the process proceeds to Step S132, in which it is determined whether the determination of Step S131 has been executed by a predetermined number of times. If such determination has not yet been executed by the predetermined number of times, the process returns to Step S130 and the determination is again carried out. If it is determined in Step S131 that the amount of noise is small, before the determination is repeated by the predetermined number of times, the process proceeds to Step S111 which is the routine for winding the film F up to the first unexposed frame.

In accordance with the fourth embodiment, a determination as to the amount of noise is carried out by a plurality of times, so that even if the control circuit 19 determines once that the amount of noise is large and causes the display circuit 32 to provide a warning display, if a photographer moves to an environment having less noise, the control circuit 19 can newly determine that the amount of noise is small. Accordingly, the operability of the camera is improved.

A fifth embodiment of the present invention will be described below with reference to the flowchart shown in FIG. 13.

The fifth embodiment is arranged to be able to display the amount of noise when the amount of noise is large.

Figure 13:
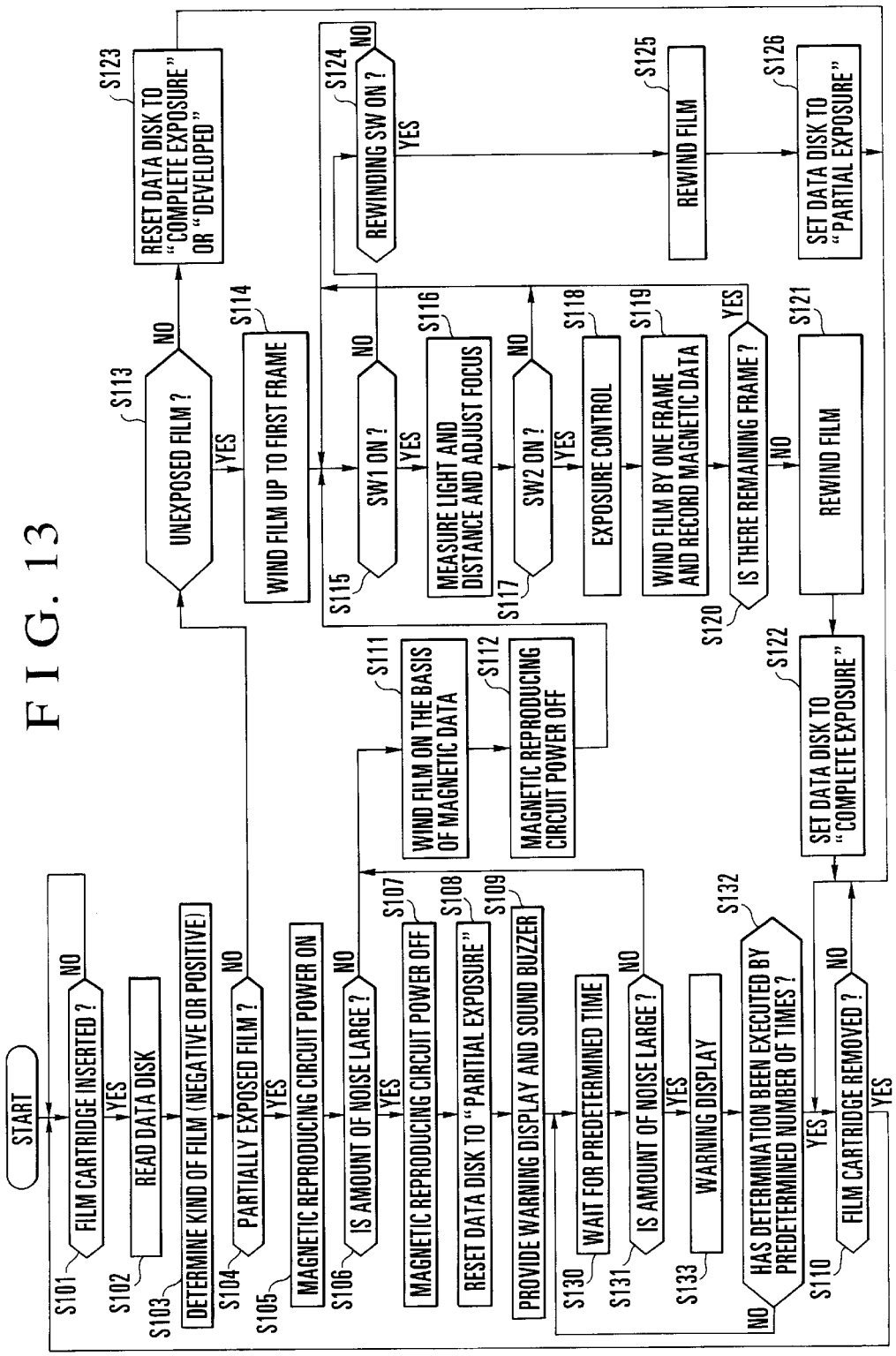
FIG. 13 is a flowchart showing a modification of the flowchart of FIG. 12 according to a fifth embodiment of the present invention.

In FIG. 13, identical reference numerals are used to denote steps identical to those shown in FIG. 12. In Step S109 of FIG. 13, the control circuit 19 causes the display circuit 32 to provide the warning display shown in FIG. 14. Specifically, the number of counts obtained in Step S201 of FIG. 8, the P—P value of the analog input FIN obtained at Step S301 of FIG. 9 or the RMS value of the analog input FIN obtained in Step S401 of FIG. 10 is normalized on the basis of a predetermined amount and the resultant value is displayed by the segment group EXDS of the LCD as a level display indicative of the amount of noise.

Figure 14:
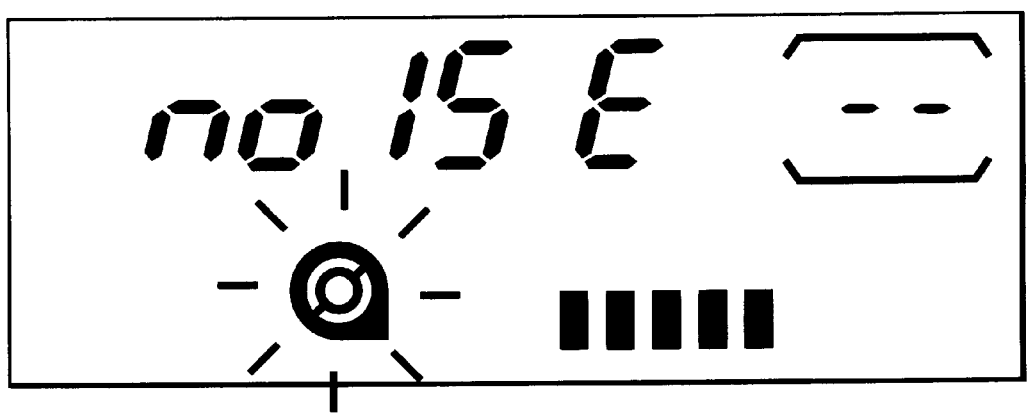
FIG. 14 is a view showing a display example of the display circuit 32 of FIG. 2 according to the fifth embodiment of the present invention.

In Step S133, the display circuit 32 is made to provide the warning display of FIG. 14 so that its display contents can be updated while the routine for determining whether the amount of noise is large is being repeated by a predetermined number of times. In Step S133, the level display is updated in accordance with the amount of noise which has been determined in the routine of Step S131.

Since the amount of noise is displayed in this manner, the photographer can immediately grasp the current amount of noise, and if the photographer moves to, for example, a location surrounded by an environment having less noise, the camera becomes able to execute a mid-roll interrupt operation. Accordingly, the operability of the camera is greatly improved.

Although in the fifth embodiment the amount of noise is displayed in the form of the aforesaid level display, the segment group FRCDS for displaying a frame counter may be used to display the amount of noise as a numerical value.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, although in Step S109 of FIG. 7 the display circuit 32 provides the warning display on an LCD, another kind of display device such as a lamp or an LED may be employed.

In each of the above-described embodiments, although the processing of reading data for determining whether the amount of noise is large is carried out in the routine of Step S106, the reading of such data as well as a determination as to whether the amount of noise is large may be executed in advance. For example, a step intended for this purpose may be inserted between Step S101 and Step S102. Of course, such a step may include the processing of controlling the power source of the magnetic reproducing circuit 36.

Although the fourth embodiment is arranged to repeat a determination as to the amount of noise by the predetermined number of times until it is determined that the amount of noise is large, the present invention can be applied to an arrangement which repeats a determination as to the amount of noise by a predetermined number of times irrespective of whether the amount of noise is small, and totally judges the determination result so as to make a final determination as to whether the amount of noise is large.

Although in each of the above-described embodiments the operation of winding the film F up to the position of the first unexposed frame is inhibited if it is determined that the amount of noise is large, the present invention can be applied to any other arrangement capable of changing the mode of control to a mode of control corresponding to a large amount of noise, for example, a mode of control for inhibiting execution of a photographic sequence, a mode of control for winding a film up to the position of its first unexposed frame and providing a display to the effect that it is uncertain whether the position up to which the film has been wound is truly the first unexposed frame, a mode of control for setting the camera to a cancellable photography-inhibited state, or a mode of control for setting a circuit which determines the position of the first unexposed position to a state capable of coping with noise.

The present invention can also be widely applied not only to an arrangement which can start reusing a partially used film at the position of the first unexposed position, but also to any other arrangement capable of identifying the position of a film, such as an arrangement capable of identifying the first frame even in the case of a completely unused film.

The present invention can also be applied to not only a magnetic method but also various other methods such as a method of optically writing or reading information to or from a film.

The present invention can also be applied to an image recording medium other than a film.

The present invention can also be applied to a film cartridge of the type which differs from the film cartridge used in each of the above-described embodiments, or to a cartridge having an image recording medium other than a film.

The present invention can also be applied to an arrangement which advances a film by one frame by winding or an arrangement which advances a film by one frame by rewinding (a so-called prewind type).

The present invention can also be carried out by combining the above-described embodiments or modifications or technical elements thereof with each other, as required.

The present invention can also be applied to various types of cameras such as single-lens reflex cameras, lens shutter cameras or video cameras, optical apparatuses other than such cameras, apparatuses other than the optical apparatuses, apparatuses applied to the cameras or the optical or other apparatuses, or elements which constitute part of such apparatuses.

As is apparent from the foregoing description, it is possible to provide a camera or a use-of-film-cartridge control device which is prevented from failing to accurately determine the position of an unused frame of a film and causing an accident such as double exposure, owing to noise.

It is also possible to provide a camera or a use-of-film-cartridge control device which is capable of appropriately executing such determination according to the kind of film.

It is also possible to provide a camera or a power source device which can prevent wasteful power consumption.

I claim:

1. An apparatus which makes it possible to start using film at a position of an unused frame, comprising:

(A) a detecting device which detects a position of an unused frame of film by reading information recorded on the film; and (B) a control device which executes a first control operation so that the film can start to be used at the position of the unused frame in accordance with a detection result by said detecting device, said control device determining whether noise which acts on said detecting device is in a predetermined state when said detecting device is not in a state of reading the information recorded on the film and executing a second control operation for restricting the first control operation in accordance with determining that the noise is in the predetermined state.

2. An apparatus according to claim 1, wherein said detecting device includes a magnetic information reading device which reads magnetic information recorded on the film.

3. An apparatus according to claim 1, wherein said detecting device includes a magnetic head which reads magnetic information recorded on the film.

4. An apparatus according to claim 1, wherein said control device includes a film transporting device which transports the film up to the position of the unused frame in accordance with a detection result by said detecting device.

5. An apparatus according to claim 1, wherein said control device determines the state of the noise on the basis of a number of times of occurrence of noise which is not less than a predetermined value and which acts on said detecting device within a predetermined period of time.

6. An apparatus according to claim 1, wherein said control device includes a pulse conversion device which converts, into a pulse, noise which is not less than a predetermined value and which acts on said detecting device, said control device determining the state of the noise on the basis of a number of pulses into which the noise is converted by said pulse conversion device within a predetermined period of time.

7. An apparatus according to claim 1, wherein said control device determines the state of the noise on the basis of a peak value of noise which acts on said detecting device.

8. An apparatus according to claim 1, wherein said control device determines the state of the noise on the basis of an effective value of noise which acts on said detecting device.

9. An apparatus according to claim 1, wherein said control device determines whether the noise which acts on said detecting device is in an allowable range.

10. An apparatus according to claim 1, wherein said control device varies, according to the kind of film, a criterion for determining whether the noise which acts on said detecting device is in the predetermined state.

11. An apparatus according to claim 1, wherein said control device varies, according to whether the film is a negative film or a positive film, a criterion for determining whether the noise which acts on said detecting device is in the predetermined state.

12. An apparatus according to claim 1, wherein said control device determines by a plurality of predetermined times whether the noise which acts on said detecting device is in the predetermined state.

13. An apparatus according to claim 1, wherein said control device repeatedly determines whether the noise which acts on said detecting device is in the predetermined state.

14. An apparatus according to claim 1, wherein said control device includes a film transporting device which transports the film up to the position of the unused frame, said control device restricting said film transporting device from transporting the film up to the position of the unused frame, in accordance with determining that. the noise which acts on said detecting device is in the predetermined state.

15. An apparatus according to claim 1, wherein said control device executes the second control operation for stopping the first control operation in accordance with determining that the noise which acts on said detecting device is in the predetermined range.

16. An apparatus according to claim 1, wherein said control device executes the second control operation for stopping a supply of electric power to said detecting device in accordance with determining that the noise which acts on said detecting device is in the predetermined state.

17. An apparatus according to claim 1, wherein said control device determines whether the noise which acts on said detecting device is in the predetermined state, and, if the noise is in the predetermined state, again determining whether the noise which acts on said detecting device is in the predetermined state.

18. An apparatus according to claim 1, wherein said control device determines whether the noise which acts on said detecting device is in the predetermined state, and, if the noise is in the predetermined state, determines whether the noise which acts on said detecting device is in the predetermined state, by a predetermined number of times until it is determined that the noise is in not the predetermined state.

19. An apparatus according to claim 1, wherein said control device determines whether the noise which acts on said detecting device is in an allowable range for said detecting device.

20. An apparatus according to claim 1, further comprising a display device which provides a display based on a result of the determination by said control device.

21. An apparatus according to claim 1, further comprising a display device which provides a display of an amount of noise, based on a result of the determination by said control device.

22. An apparatus according to claim 1, further comprising a second detecting device which detects whether the film is partially used, from an index of a film cartridge, said control device performing, in accordance with a detection result of said second detecting device detecting that the film is partially used, an operation according to a state of noise which acts on said detecting device.

23. An apparatus according to claim 1, wherein said control device determines the state of the noise which acts on said detecting device, before said detecting device performs an operation for detecting the position of the unused frame.

24. An apparatus according to claim 1, wherein said control device determines the state of the noise which acts on said detecting device, via said detecting device.

25. An apparatus according to claim 1, wherein said control device determines a state of magnetic noise which acts on said detecting device.

26. An apparatus according to claim 1, wherein said apparatus includes a camera.

27. An apparatus for detecting a position of an unused frame of a film, comprising:
 (a) a detecting device which detects a position of an unused frame of a film by reading information recorded on the film; and
 (b) a control device which determines whether noise which acts on said detecting device is in a predetermined state when said detecting device is not in a state of reading the information recorded on the film and, in accordance with determining that the noise is in the predetermined state, executing a control operation for restricting said detecting device from detecting the position of the unused frame of the film.

28. An apparatus according to claim 27, wherein said apparatus includes a camera.

29. An apparatus for reading magnetic information on a film, comprising:

(a) a magnetic information reading device which reads magnetic information recorded on the film; and (b) a control device which determines whether noise which acts on said magnetic information reading device is in a predetermined state when said reading device is not in a state of reading the magnetic information recorded on the film, and stops a supply of electric power to said magnetic information reading device in accordance with determining that the noise is in the predetermined state.

30. An apparatus according to claim 29, wherein said apparatus includes a camera.

31. An apparatus which makes it possible to start using a film at a position of an unused frame, comprising:

(a) a detecting device which detects a position of an unused frame of a film by reading information recorded on the film; and (b) a control device which executes a first control operation so that the film can start to be used at the position of the unused frame in accordance with a detection result by said detecting device, said control device determining whether more than a predetermined noise acts on said detecting device when said detecting device is not in a state of reading the information recorded on the film and executing a second control operation for restricting the first control operation in accordance with determining that more than the predetermined noise acts on said detecting device.

32. An apparatus according to claims 31, wherein said detecting device includes a magnetic information reading device which reads magnetic information recorded on the film.

33. An apparatus according to claim 31, wherein said detecting device includes a magnetic head which reads magnetic information recorded on the film.

34. An apparatus according to claim 31, wherein said control device includes a film transporting device which transports the film up to up to the position of the unused frame in accordance with a detection result by said detecting device.

35. An apparatus according to claim 31, wherein said control device determines more than the predetermined noise on the basis of a number of times of occurrence of noise which is not less than a predetermined value and which acts on said detecting device within a predetermined period of time.

36. An apparatus according to claim 31, wherein said control device includes a pulse conversion device which converts, into EL pulse, noise which is not less than a predetermined value and which acts on said detecting device, said control device determining more than the predetermined noise on the basis of a number of pulses into which the noise is converted by said pulse conversion device within a predetermined period of time.

37. An apparatus according to claims 31, wherein said control device determines more than the predetermined noise on the basis of a peak value of noise which acts on said detecting device.

38. An apparatus according to claim 31, wherein said control device determines more than the predetermined noise on the basis of an effective value of noise which acts on said detecting device.

39. An apparatus according to claim 31, wherein said control device determines whether noise which acts on said detecting device is in an allowable range.

40. An apparatus according to claim 31, wherein said control device varies the predetermined noise according to the kind of film.

41. An apparatus according to claim 31, wherein said control device varies the predetermined noise according to whether the film is a negative film or a positive film.

42. An apparatus according to claim 31, wherein said control device determines by a plurality of predetermined times whether more than the predetermined acts on said detecting device.

43. An apparatus according to claim 31, wherein said control device repeatedly determines whether more than the predetermined noise acts on said detecting device.

44. An apparatus according to claim 31, wherein said control device includes a film transporting device which transports the film up to the position of the unused frame, said control device restricting said film transporting device from transporting the film up to the position of the unused frame, in accordance with determining that more than the predetermined noise acts on said detecting device.

45. An apparatus according to claim 31, wherein said control device executes the second control for stopping the first control operation in accordance with determining that more than the predetermined noise acts on said detecting device.

46. An apparatus according to claim 31, wherein said control device executes the second control for stopping a supply of electric power to said detecting device in accordance with determining that more than the predetermined noise acts on said detecting device.

47. An apparatus according to claim 31, wherein said control device determines whether more than the predetermined noise acts on said detecting device and, if more than predetermined noise acts or said detecting device, again determines whether more than the predetermined noise acts on said detecting device.

48. An apparatus according to claims 31, wherein said control device determines whether more than the predetermined noise acts on said detecting device and, if more than predetermined noise acts on said detecting device determines whether more than the predetermined noise acts on said detecting device, by a predetermined number of times until it is determined that more than the predetermined noise does not act on said detecting device.

49. An apparatus according to claim 31, wherein said control device determines whether noise which acts on said detecting device is in an allowable range for said detecting device.

50. An apparatus according to claim 31, further comprising a display device which provides a display based on a result of the determination by said control device.

51. An apparatus according to claim 31, further comprising a display device which provides a display of an amount of noise, based on a result of the determination by said control device.

52. An apparatus according to claim 31, further comprising a second detecting device which detects whether the film is partially used, from an index of a film cartridge, said control device performing, in accordance with a detection result of said second detecting device detecting that the film is partially used, an operation according to a state of noise which acts on said detecting device.

53. An apparatus according to claim 31, wherein said control device determines whether more than the predetermined noise acts on said detecting device, before said detecting device performs an operation for detecting the position of the unused frame.

54. An apparatus according to claim 31, wherein said control device determines whether more than the predetermined noise acts on said detecting device, via said detecting device.

55. An apparatus according to claim 31, wherein said control device determines magnetic noise as more than the predetermined noise.

56. An apparatus according to claim 31, wherein said apparatus includes a camera.

57. An apparatus comprising:
- (a) a reading device which reads information recorded on a film; and
- (b) a control device which determines whether noise which acts on said reading device is in a predetermined state when said reading device is not in a state of reading the information recorded on the film and, in accordance with determining that the noise is in the predetermined state, executing a control operation for restricting said reading device from reading the information recorded on the film.

58. An apparatus according to claim 57, wherein said apparatus includes a camera.

59. An apparatus for reading magnetic information on a film, comprising:
- (a) a magnetic information reading device which reads magnetic information recorded on the film; and
- (b) a control device which determines whether more than a predetermined noise acts on said magnetic information reading device when said magnetic information reading device is not in a state of reading the information recorded on the film, and stops a supply of electric power to said magnetic information reading device in accordance with determining that more than the predetermined noise acts on said magnetic information reading device.

60. An apparatus according to claim 59, wherein said apparatus includes a camera.

\* \* \* \* \*

UNITED STATES PATENT AND TRADEMARK OFFICE
CERTIFICATE OF CORRECTION

PATENT NO. : 5,995,769
DATED : November 30, 1999
INVENTOR(S) : Toshiyuki Kumakura It is certified that error appears in the above-identified patent and that said Letters Patent are hereby corrected as shown below:

Col. 15, line 48, delete "EL" and insert -- a --.

Signed and Sealed this

Seventeenth Day of April, 2001

Attest:

NICHOLAS P. GODICI

*Attesting Officer*     *Acting Director of the United States Patent and Trademark Office*